United States Patent [19]

Comer

[11] 4,374,465
[45] Feb. 22, 1983

[54] ATTACHMENT FOR ROTARY LAWN MOWER

[75] Inventor: Robert C. Comer, Hopkins, Minn.

[73] Assignee: The Toro Company, Minneapolis, Minn.

[21] Appl. No.: 344,910

[22] Filed: Feb. 2, 1982

[51] Int. Cl.³ .......................................... A01D 55/18
[52] U.S. Cl. .................................... 56/12.7; 56/13.7; 56/295
[58] Field of Search ...................... 56/12.7, 295, 13.7, 56/13.8, 16.9

[56] References Cited

U.S. PATENT DOCUMENTS

| 3,507,104 | 4/1970 | Kline et al. | 56/295 |
| 4,058,959 | 11/1977 | Moss et al. | 56/295 |
| 4,089,114 | 5/1978 | Doolittle et al. | 56/12.7 |
| 4,201,034 | 5/1980 | Frantello | 56/12.7 |

Primary Examiner—Jay N. Eskovitz
Attorney, Agent, or Firm—Joseph P. Martin

[57] ABSTRACT

A rotary lawn mower (2) has a rigid cutting blade (6) rotatable in a housing (4). A filament holder (12) is releasably attached to blade (6) through aperture (16) by mounting means consisting of tab (22), neck (24), and collar (26). Filament holder (12) releasably contains a filament (14) which extends beyond housing (4) and provides a trimming function outside housing (4).

10 Claims, 8 Drawing Figures

ATTACHMENT FOR ROTARY LAWN MOWER

TECHNICAL FIELD

This invention relates to a rotary lawn mower having a rigid blade and a housing with side walls forming a cutting chamber. More specifically, this invention relates to means for attaching a filament to the blade to enable trimming of vegetation beyond the side walls of the housing.

BACKGROUND OF THE INVENTION

Rotary lawn mowers having a rigid blade with sharpened edges and a power source rotating the blade in a horizontal plane are well known. The blade is located inside a housing having a top wall and side walls which define an enclosed cutting chamber that contains the blade. This type of mower cuts standing vegetation by the action of the sharpened edges contacting the vegetation as the mower is moved over the ground. Thus, a relatively high blade speed is required for efficient cutting. This high speed of rotation, in conjunction with the rigidity of the blade, necessitates that the blade be inside the housing to avoid injury to the operator or bystanders, or damage to property, either from direct contact with the blade or from missiles thrown by the blade.

Because the housing side walls extend beyond the end of the blade, with their lower edge being usually slightly below the plane of cut, mowers of this type cannot be used for close-in trimming along foundations, walls, trees, and the like, thereby leaving unsightly, uncut vegetation adjacent these objects. This uncut vegetation must then be trimmed manually, which is a laborious and time-consuming process; or with a trimming device which uses a spinning flexible line. This latter method, while reasonable effective, requires the added expense of a second machine for the trimming function, and the inconvenience and additional time required for trimming after the original mowing operation.

Filament mowers have recently been introduced, some of which utilize various means to provide a trimming as well as cutting capability. One such device is disclosed in U.S. Pat. No. 4,232,505, assigned to The Toro Company, the assignee of the present invention. This device is presently produced and marketed by The Toro Company as the Toro Mower/Trimmer. In this purely filament mower, the filament continuously extends outwardly through cut out portions of the side walls of the housing. The disadvantages of this type of device are that the filament is always extending out past the housing even when mowing, which results in premature wear of the line, and the necessity for frequent replenishment. In addition, it may not always be desirable to have the cutting element extending beyond the housing, such as when operating near flowers, young trees, and other tender vegetation which may be damaged.

U.S. Pat. No. 4,282,704 to Stevens discloses a filament mower in which the filament also continuously extends outwardly through the side walls of the housing, and in addition discloses a portion of the front wall which can be pivoted upwardly to expose the filament for trimming at the front of the mower. This mower possesses all the disadvantages of the previous idea, plus the considerable expense of the pivoting front wall, and the required mechanism to effect the pivoting of the front wall.

Patent application Ser. No. 121,819, assigned to The Toro Company, the assignee of the present invention, in one embodiment discloses a filament mower with cut off portions of the side walls which allows the filament to continuously extend beyond the side walls of the housing. A second embodiment discloses pivotable side walls which can be selectively lowered or raised for trimming. The first embodiment possesses the same disadvantages of a continually extended filament as disclosed in U.S. Pat. No. 4,232,505. The second embodiment possesses the same disadvantages as disclosed in U.S. Pat. No. 4,282,704, i.e., the considerable added expense of a specialized housing with pivoting side walls.

None of the three prior ideas are readily adaptable to use as a rigid blade mower, because of the obvious safety considerations caused by the cut out or pivotable portions of the housing, which expose the rigid blade outside the protection offered by the housing.

U.S. Pat. No. 4,201,034 to Frantello, discloses a mower wherein a bar or plate with a filament containing cylinder at each end replaces the blade. This device is adapted for cutting merely with the filament which extends from the cylinders, and the plate or bar carrying the cylinders is not designed for cutting, i.e., is not a blade. Similarly, U.S. Pat. No. 4,295,324, also to Frantello, discloses a head which replaces the conventional blade. This head carries filaments at its outer ends. However, these filaments are disposed in the plane of cut of the original blade. Since the plane of cut of the blade is contained within the housing for safety, this places the filaments of this invention also within the housing, thus precluding their being used to trim outside the housing.

SUMMARY OF THE INVENTION

One aspect of this invention is to provide an attachment for a rotary lawn mower having a rigid cutting blade, which enables the mower to be used to trim vegetation outside the mower housing with the flexible filament. It is a further aspect of this invention to make the attachment easily removable when a purely mowing function is desired.

BRIEF DESCRIPTION OF THE DRAWINGS

This invention will be described more fully hereafter in the Detailed Description, when taken in conjunction with the following drawings, in which like reference numerals refer to like elements throughout.

DETAILED DESCRIPTION

Figure 1:
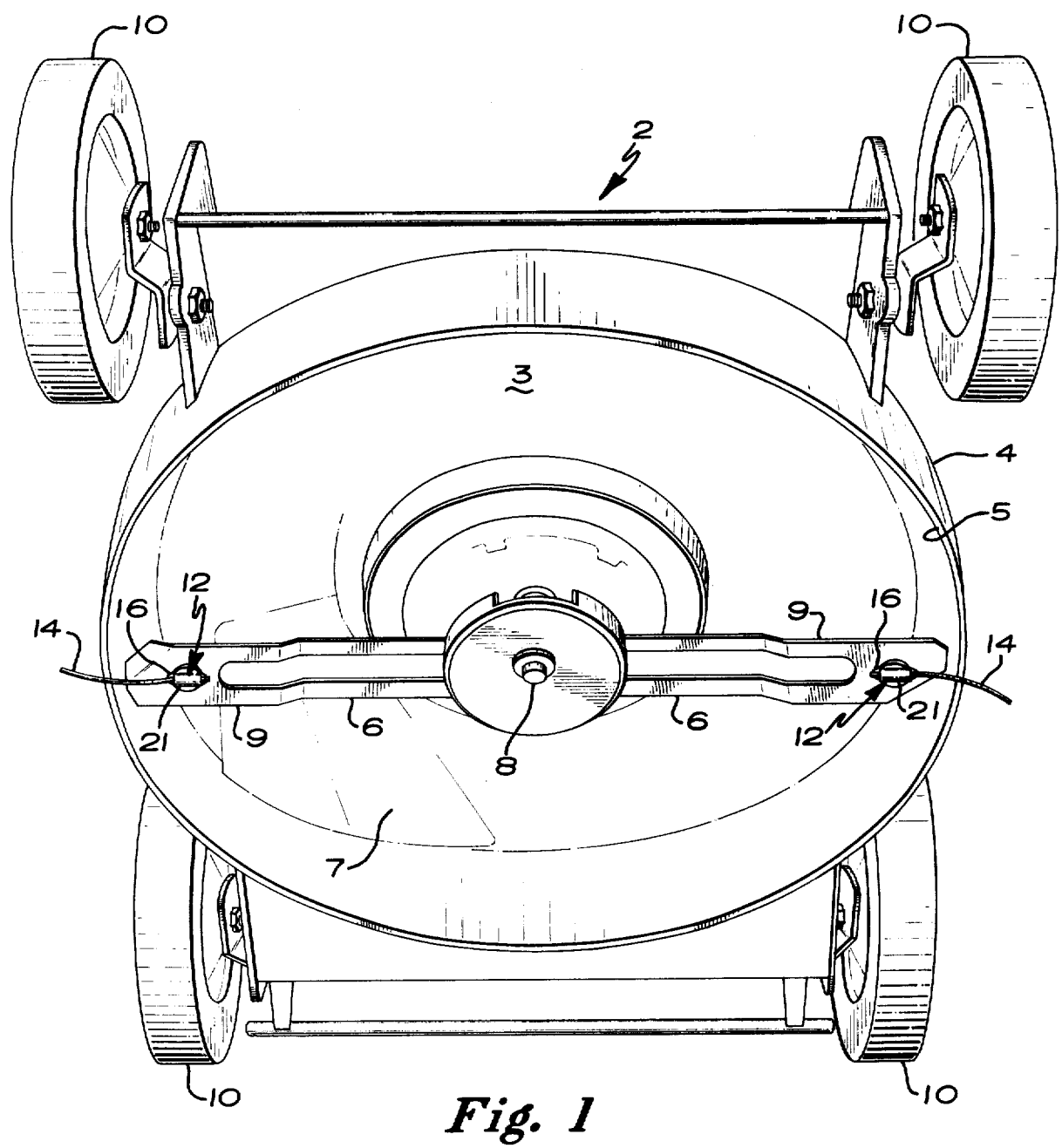
FIG. 1 is a perspective view of the underside of a typical rotary mower according to this invention, particularly illustrating a filament holder secured to the rigid cutting blade with said holder containing a flexible cutting filament extending out beyond the side walls of the housing.

A rotary mower according to this invention is shown as 2 in FIG. 1. Mower 2 includes a generally circular housing having a top deck 3 and a circumferentially extending side wall 4 that depends downwardly from deck 3. Side wall 4 terminates in a lower edge 5. Together top deck 3 and side wall 4 define a substantially enclosed cutting chamber 7 that encloses a rigid cutting blade 6 made from a suitable metallic material such as steel.

The housing is supported at a selected height above the ground by any suitable means, such as a plurality of wheels 10. However, a ground effect air cushion support means or other means may also be utilized.

Blade 6 has one or more sharpened cutting edges 9, and is attached by a blade retainer 8 to a power source (not shown) which may be any suitable means for rotating blade 6 at a speed sufficient to sever standing vegetation. The power source may be an internal combustion engine, or an electric motor, mounted on deck 3. When blade 6 is so attached to the power source, the plane of the blade is above the lower edge 5 of side wall 4 for safety.

According to the present invention, filament holders 12 are secured to blade 6 near its outer ends, by mounting means to be discusssed hereinafter, and filaments 14 are secured in holders 12 and extend below and beyond lower edge 5 of side wall 4. In this preferred embodiment of the invention, filaments 14 are capable of trimming outside of side wall 4.

Figure 2:
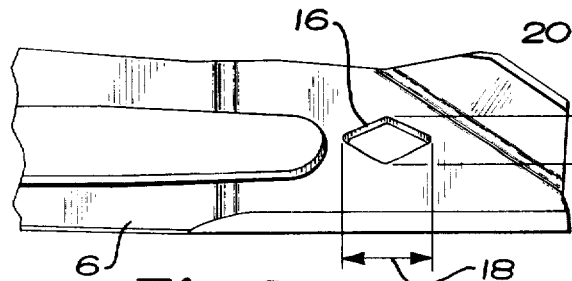
FIG. 2 is a top plan view of a rigid cutting blade as used in the mower of FIG. 1, illustrating the aperture in the blade for the filament holder prior to engagement of the filament holder in the aperture.

Referring now to FIG. 2, blade 6 is provided with at least one diamond-shaped aperture 16, which is part of the mounting means referred to above. Aperture 16 has a long dimension 18 radially aligned with the longitudinal axis of blade 6, and a short dimension 20 perpendicular to long dimension 18.

Referring now to FIGS. 4–7, filament holder 12 includes a relatively thin, vertically elongaged body member 21. A circular, horizontally arranged, and outwardly extending collar member 26 is formed adjacent the top of body member 21. A diamond-shaped mounting tab 22 is spaced above collar member 26 by an integrally formed neck 24. The height of neck 24 is slightly greater than the thickness of blade 6. Preferably, body member 21, tab 22, neck 24 and collar member 26 are all integrally formed from any suitable plastic material, such as Delrin.

Mounting tab 22 has a long dimension 23 and a short dimension 25 which configures tab 22 generally in the same shape as aperture 16, but slightly smaller, so that tab 22 can be inserted through aperture 16 in a relatively close fit. Neck 24 may be of a generally elliptical shape, with a long dimension 27 and a short dimension 29. Long dimension 27 is less than the long dimension 23 of tab 22, but just slightly greater than the short dimension 20 of aperture 16. The short dimension 29 of neck 24 may be equal to or less than the short dimension 25 of tab 22. Tab 22 and neck 24 are part of the mounting means previously referred to. Circular collar 26 has a diameter greater than the short dimension 20 of aperture 16, so that collar 26 can not pass through aperture 16. When holder 12 is mounted in its operative position on blade 6, collar 26 will abut the bottom of blade 6.

A substantially horizontal opening or bore 28 is provided near the lower end of body member 21 extending all the way therethrough. Bore 28 is perpendicular to long dimension 23 of tab 22 so that when holder 12 is secured in its operative cutting position in blade 6 as described hereafter, bore 28 will be in radial alignment with blade 6.

Figure 8:
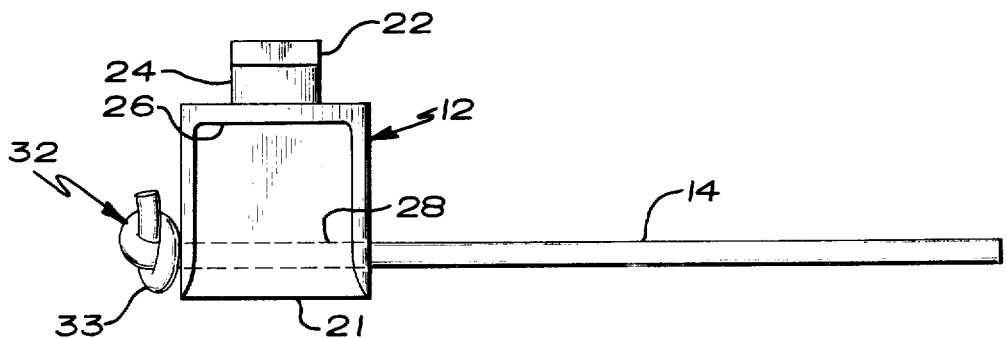
FIG. 8 is a side elevational view of the holder with the cutting filament inserted therein, and illustrating retention means for the filament.

Filament 14 is inserted through bore 28, until retention means 32 abuts holder 12. As shown in FIG. 8, retention means 32 is simply a knot 33 in one end of filament 14. Any other suitable means for releasably retaining filament 14 in holder 12 could be used. It has been found that the optimum length of the filament 14 extending beyond side wall 4 when filament 14 is in the extended operative position, is 1" to 4" with an optimum diameter of 0.060 to 0.125 inches. Filament 14 together with holder 12 will be coupled to blade 6 in a manner to be described hereinafter.

Since the cutting plane of blade 6 is above lower edge 5 of side wall 4, the vertical dimension of body member 21 from collar member 26 down to the level of bore 28 is chosen to be sufficient to place filament 14 in a cutting plane parallel to the cutting plane of blade 6, but below lower edge 5 of side wall 4, when holder 12 is coupled to blade 6. In this location, filament 14 is sufficiently long to extend below and out beyond housing side wall 4 to provide trimming capability as shown in FIG. 1.

Figure 4:
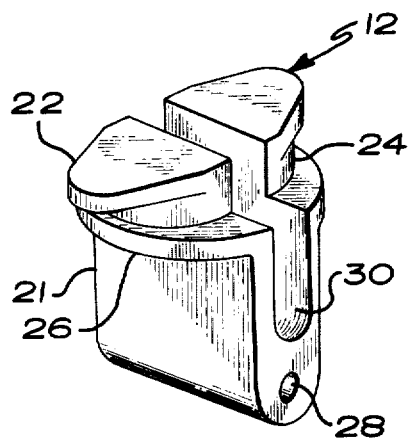
FIG. 4 is an enlarged perspective view of the filament holder of FIG. 1, particularly illustrating the body, collar member, mounting tab and neck thereof.
Figure 5:
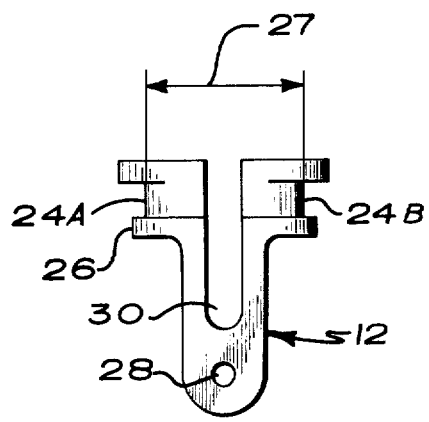
FIG. 5 is an end elevational view of the filament holder of FIG. 4.
Figure 6:
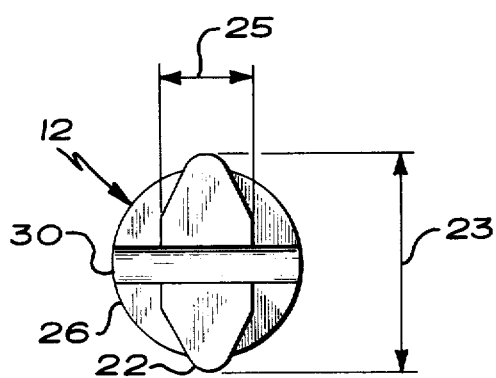
FIG. 6 is a top plan view of the filament holder of FIG. 4, particularly illustrating the long and short dimensions of the mounting tab.
Figure 7:
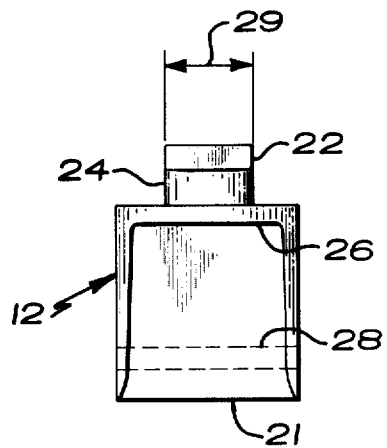
FIG. 7 is a side elevational view of the filament holder of FIG. 4.

A slot 30 is cut in holder 12 parallel to bore 28 and perpendicular to long dimension 23 of tab 22. Slot 30 passes through tab 22, neck 24, and collar 26, terminating slightly above bore 28. Slot 30, thus bifurcates holder 12 and creates opposed portions 24A and 24B of neck 24 as best illustrated in FIGS. 4 and 5. Slot 30, in conjunction with the suitable plastic material of filament holder 12 gives an outward biasing force on the opposed portions of neck 24 in a manner to be described hereinafter.

In the normal mowing operation, without the holder and filament coupled to the blade, the cutting is done by the blade, and is confined to the area within the cutting chamber. It is preferred that no portion of the blade 6 extend below the cutting edges 9. Any protrusion below the cutting edges will drag in the cut grass, thus imposing an additional load on the power source. In addition, any downward protrusion will bruise the cut off tips of the standing grass, and may result in unsightly "browning" of the grass in the next day or two. Thus, it is preferred that filament holder 12 with filament 14, be attached only when trimming is actually desired. The ease of attachment of the present invention adds considerably to its utility.

If the operator of the mower wishes to trim either during or after mowing, filament holder 12 with filament 14 installed, may be coupled to blade 6 in the following manner. Tab 22 of filament holder 12 is first inserted through aperture 16 from the bottom of blade 6, with long dimension 23 of tab 22 in alignment with the long dimension 18 of aperture 16, until collar 26 abuts against the bottom of blade 6. Holder 12 is then rotated 90° in aperture 16 so that filament 14 now extends outwardly from the end of blade 6. In this rotated position of holder 12, the long dimension 27 of neck 24 is now aligned with short dimension 20 of aperture 16. Since the long dimension 27 of neck 24 is slightly greater than the short dimension 20 of aperture 16, the presence of slot 30 allows the neck to be slightly radially compressed with the opposed portions 24A and 24B of neck 24 being moved closer toward each other. A biasing force has now been established on the neck since the opposed portions 24A and 24B will tend to return to their original uncompressed position against the inward bias. This biasing force defines a frictional engagement of neck 24 in aperture 16 which helps retain holder 12 in aperture 16. Moreover, the long dimension 23 of tab 22 is now also aligned with the short dimension 20 of aperture 16 so that tab 22 is retained on the top side of blade 6 and cannot fall back through aperture 16. See FIG. 3. This acts in conjunction with said frictional engagement to retain holder 12 in the aperture 16 in blade 6.

When holder 12 with a filament 14 inserted therein is coupled to blade 6 as described above, trimming may be accomplished on either side of the mower.

Figure 3:
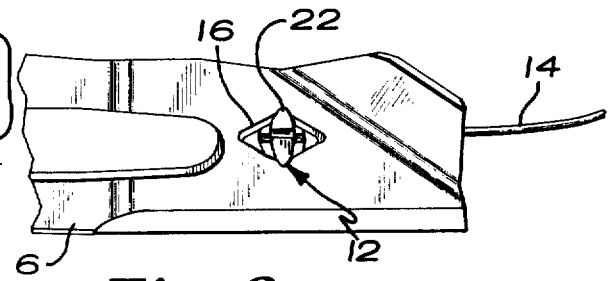
FIG. 3 is a top plan view of the blade of FIG. 2, illustrating the filament holder of FIG. 1 secured to the blade at the aperture thereof.

When trimming is not desired, holder 12 can be easily removed without tools by rotating it 90° from its FIG. 3 position until the long dimension 23 of tab 22 is aligned with long dimension 18 of aperture 16 and by then pulling down on holder 12 to remove from the bottom side of blade 6.

This invention is particularly advantageous to those who presently own a rotary lawn mower. It provides an economical and convenient means to convert a standard mowing machine to a machine that will both mow and trim. This invention obviates the need to buy a separate lawn trimmer, thereby avoiding the expense of the second machine. In addition, a mower with a standard housing may be used with this invention, without the need for a specialized housing with pivotable or cut out walls, thus reducing the initial expense of the lawn mower itself. All that is needed to utilize this invention is a replacement blade having aperture 16 and one or more of the relatively inexpensive filament holders 12.

Another advantage is the ease of attaching and removing the filament and holder from the blade. It merely involves raising the mower slightly, inserting the holder, and rotating to the operative position. This operation may be performed even while the mower is hot, since it is not necessary to invert the mower or even raise the mower so high that it would cause gasoline or oil to spill. Since the filament holder 12 can be attached to the cutting blade 6, time need not be spent removing the cutting blade to bolt an additional bar or head to the drive shaft as is true of some prior art patents. This adds to the utility of the present invention.

Another advantage of this invention is that the insertion and removal of the filament and holder can be accomplished without any special tools.

Various modifications of this invention will be apparent to those skilled in the art. For example, the aperture 16 in blade 6 and the corresponding portions of holder 12 could be elliptical in shape. Further, while aperture 16 are preferably located adjacent each end of blade 6, only one aperture 16 adjacent one end is strictly necessary. Accordingly, the scope of this invention is to be limited only by the appended claims.

What is claimed is:

1. A rotary lawn mower of a type having a housing that includes a cutting chamber bounded by downwardly depending side walls having a lower edge; means for supporting said housing for movement over a ground surface at a selected height thereabove; a substantially rigid cutting blade located within said cutting chamber, wherein said cutting blade has a top side and a bottom side and at least one sharpened cutting edge; and means in said housing for rotating said blade in a substantially horizontal cutting plane such that said cutting edge severs standing vegetation; wherein the improvement relates to a trimming attachment for said blade, which comprises:
   (a) a filament holder;
   (b) means for selectively and releasably mounting said holder in said blade; and
   (c) a flexible filament contained in said holder, which filament extends radially outwardly relative to said blade and is sufficiently long to extend out past the side walls of said housing when said holder is mounted on said blade, whereby said filament can be used to trim vegetation outside said housing by selectively coupling said filament holder to said blade.

2. A rotary lawn mower as recited in claim 1, wherein the blade includes an aperture adjacent one end thereof, and wherein the filament holder includes an engagement means capable of being inserted into and through said aperture from the bottom side of said blade without tools for releasably coupling said filament holder to said blade, wherein the aperture and engagement means define the mounting means.

3. A rotary lawn mower as recited in claim 2, wherein the engagement means is configured relative to the aperture such that the engagement means is capable of being inserted into the aperture in a first position of the filament holder but cannot be withdrawn through the aperture in a second rotated position of the filament holder.

4. A rotary lawn mower as recited in claim 2, wherein the filament holder comprises:
   (a) an elongated body member;
   (b) a collar member adjacent the top of the body member which collar member is sized larger than said aperture; and
   (c) a mounting tab integrally connected to said collar by a neck which neck is slightly longer than the thickness of the rigid blade, wherein the mounting tab has a first dimension which allows said tab to be inserted into and through said aperture and a second dimension which causes said mounting tab to be retained on the top side of said blade above said aperture.

5. A rotary lawn mower as recited in claim 4, wherein said mounting tab and said aperture each have long and short dimensions, wherein the long dimension of the mounting tab is slightly less than the long dimension of the aperture to allow the tab to pass through the aperture, and wherein the long dimension of the mounting tab is greater than the short dimension of the aperture such that the mounting tab cannot pass through the aperture when the tab is rotated relative to the aperture such that the long dimension of the tab and the short dimension of the aperture are aligned.

6. A rotary lawm mower as recited in claim 4, wherein the body, collar member, neck and mounting tab of the filament holder are split by a central slot therein, and wherein said filament holder is made of a material which in conjunction with the central slot establishes an outward bias of the neck when the filament holder is in the second rotated position such that the neck of the filament holder frictionally engages the aperture to further retain the filament holder therein.

7. The lawn mower of claim 5, wherein said filament is retained in said holder by a diametric enlargement of said filament adjacent its inner end.

8. The lawn mower of claim 1, wherein said filament has a diameter within the range of 0.060 to 0.125 inch.

9. The lawn mower of claim 8, wherein the length of said filament extending beyond said side wall is 1" to 4" when said filament is in the extended operative position.

10. A rotary lawn mower of the type having a housing that includes a cutting chamber bounded by downwardly depending side walls having a lower edge; means for supporting said housing for movement over a ground surface at a selected height thereabove; a substantially rigid cutting blade located within said cutting chamber, wherein said blade has a top side and a bottom side and at least one sharpened cutting edge; and means in said housing for rotating said blade in a substantially horizontal cutting plane at a speed sufficient to sever standing vegetation; wherein the improvement relates to a trimming attachment for said blade, which comprises:

(a) a filament holder;
(b) means for selectively installing and removing a filament in said holder;
(c) means for selectively and releasably mounting said holder in said blade from the bottom side of said blade without tools; and
(d) a flexible filament contained in said holder, which filament is long enough to extend beyond said housing side walls when said filament is extended in operating position, thereby allowing trimming of vegetation outside said walls of said housing.

* * * * *